United States Patent [19]

Vella

[11] 4,187,972
[45] Feb. 12, 1980

[54] APPARATUS INCLUDING GENERAL PURPOSE DESOLDERER AND MEANS FOR CONVERTING THE GENERAL PURPOSE DESOLDERER TO EITHER A SOLDERING IRON OR A SPECIAL PURPOSE DESOLDERER

[75] Inventor: Alexander J. Vella, Bethesda, Md.

[73] Assignee: Pace Incorporated, Silver Spring, Md.

[21] Appl. No.: 891,041

[22] Filed: Mar. 28, 1978

[51] Int. Cl.² .............................................. B23K 3/02
[52] U.S. Cl. ..................................... 228/20; 219/238; 228/54; 228/55
[58] Field of Search ....................... 228/20, 55, 52, 53, 228/54; 219/230, 238

[56] References Cited

U.S. PATENT DOCUMENTS

| | | | |
|---|---|---|---|
| 2,261,015 | 10/1941 | Brody | 228/53 |
| 2,609,778 | 9/1952 | Bleam | 228/20 |
| 3,080,842 | 3/1963 | Rice | 228/54 |
| 3,163,145 | 12/1964 | Duhaime | 228/20 |
| 3,232,509 | 2/1966 | Newton | 219/230 |
| 3,245,598 | 4/1966 | Kopernak | 228/20 |
| 3,259,293 | 7/1966 | Dezzani | 228/20 |
| 3,315,350 | 4/1967 | Kent | 228/54 |
| 3,392,897 | 7/1968 | Siegel | 228/20 |
| 3,970,234 | 7/1976 | Litt | 228/20 |
| 3,987,954 | 10/1976 | Litt | 228/20 |
| 4,023,724 | 5/1977 | Wakita | 228/20 |

Primary Examiner—Francis S. Husar
Assistant Examiner—Gene P. Crosby
Attorney, Agent, or Firm—Gerald J. Ferguson, Jr.; Joseph J. Baker

[57] ABSTRACT

A general purpose desolderer and means for converting the general purpose desolderer to either a soldering iron or a special purpose desolderer is disclosed. The general purpose desolderer may be converted to a soldering iron or to a special purpose desolderer by mounting the proper tip over the desoldering tip where the configuration of the distal end of the tip may be any one of various predetermined shapes depending upon the particular application, whereby the general purpose desolderer may be quickly and easily converted to other modes of operation.

31 Claims, 19 Drawing Figures

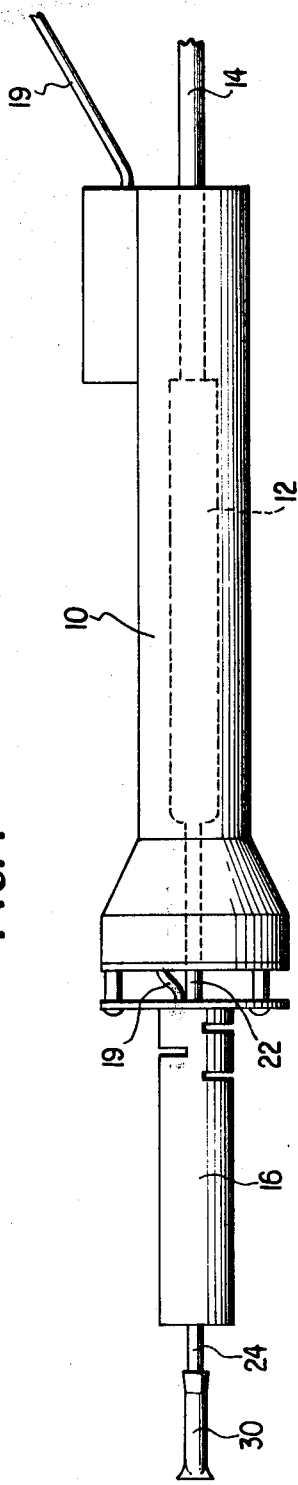
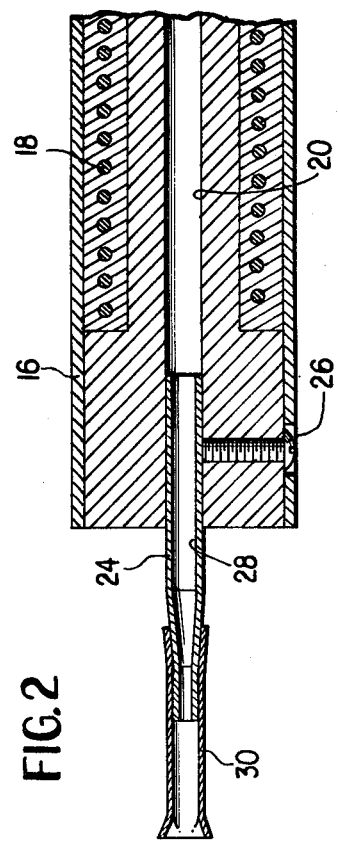
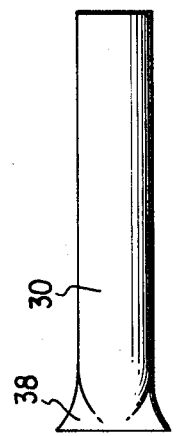
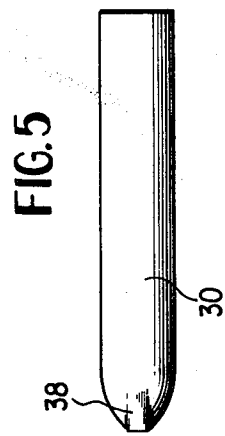
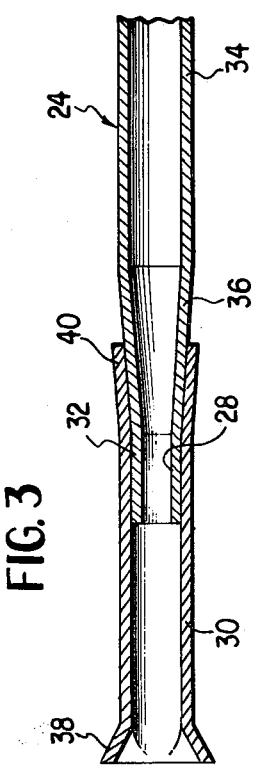
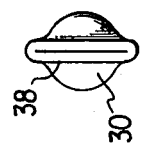

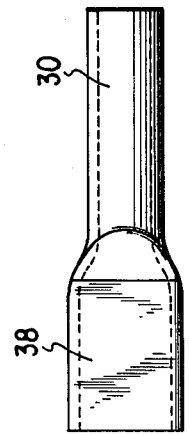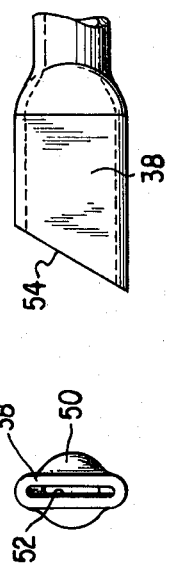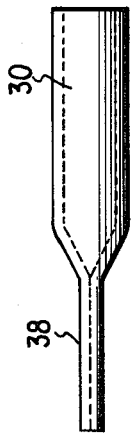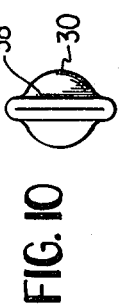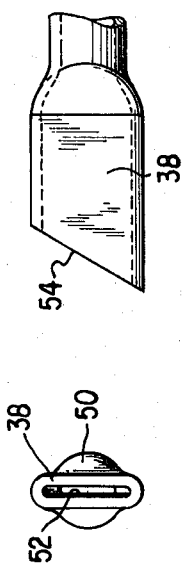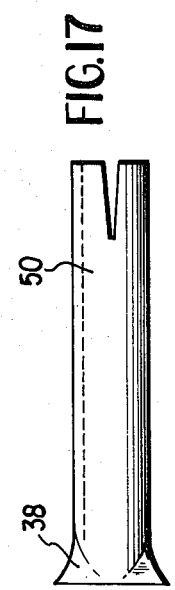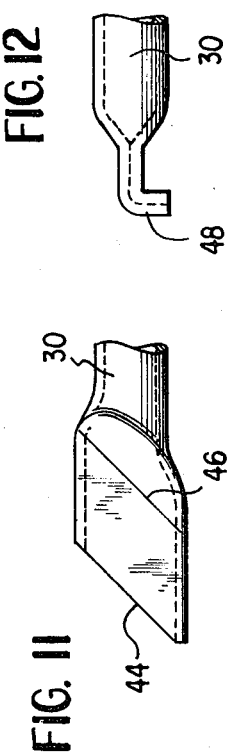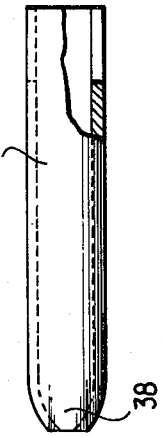

4,187,972

APPARATUS INCLUDING GENERAL PURPOSE DESOLDERER AND MEANS FOR CONVERTING THE GENERAL PURPOSE DESOLDERER TO EITHER A SOLDERING IRON OR A SPECIAL PURPOSE DESOLDERER

BACKGROUND OF THE INVENTION

1. Field of the Invention

This invention is directed to soldering and desoldering devices and in particular to apparatus including a general purpose desolderer and means for converting the general purpose desolderer to either a soldering iron or a special purpose desolderer.

2. Discussion of the Prior Art

There are many instances when a repairman of electronic devices must both desolder and solder various connections in the circuitry being repaired. Conventionally, separate devices are employed to effect these two functions. However, in many situations, it is desirable to reduce the number of tools needed to effect the repairs. For example, a home TV repairman would preferably make the needed repairs with but a single tool. This not only reduces the number of tools to be transported but also reduces the number of tools that have to be introduced into the working space which may at times be quite small.

It is heretofore known to provide soldering irons which may be converted to desoldering devices. For example, see U.S. Pat. Nos. 2,609,778; 3,163,145; 3,245,598; 3,259,293 and 3,970,234. Some of these approaches have provided fairly effective solutions to the above discussed problem. However, whenever a soldering iron is converted to a desolderer, a bifurcated path is established wherein the soldering function is implemented through one path and the desoldering function is implemented through the other path. In other words, a desoldering device is attached to the soldering iron, the purpose of the iron being to heat the desoldering tip whereby the molten solder can be sucked into a collection chamber. The heat from the soldering iron is applied through one of the above-mentioned parts and the molten solder is sucked through the other of the paths where the solder collection chamber is disposed outside the handle of the soldering iron. Hence, there is a tendency for the above structure to be unwieldy and difficult to insert into small working spaces.

SUMMARY OF THE INVENTION

Accordingly, it is a primary object of this invention to provide apparatus including a general purpose desolderer and means for easily and quickly converting the general purpose desolderer to a soldering iron where the iron typically occupies essentially the same amount of space as the general purpose desolderer.

It is a further primary object of this invention to provide apparatus of the above type wherein the general purpose desolderer may be easily and quickly converted to a special purpose desolderer where the special purpose desolderer occupies essentially the same space as the general purpose desolderer.

It is a further object of this invention to provide improved soldering tips which may be attached to a general purpose desolderer to thereby convert the desolderer to a soldering iron.

It is a further object of this invention to provide improved special purpose desoldering tips which may be attached to a general purpose desolderer to thereby convert the general purpose desolderer to a special purpose desolderer.

It is a further object of this invention to provide an improved desoldering tip which may be employed in a general purpose desolderer and which facilitates the conversion of the desolderer to a soldering iron or a special purpose desolderer.

Other objects and advantages of this invention will be apparent from a reading of the following specification and claims taken with the drawing.

BRIEF DESCRIPTION OF THE DRAWING

FIG. 1 is a side view of illustrative apparatus including a general purpose desolderer, the desolderer having been converted to a soldering iron in accordance with the invention.

FIG. 2 is an enlarged, cross-sectional view of an illustrative heater assembly, general purpose desoldering tip and soldering tip of FIG. 1.

FIG. 3 is an enlarged, cross-sectional view of the general purpose desoldering tip and soldering tip of FIG. 2.

FIGS. 4, 5 and 6 are side, top and end views of the soldering tip of FIG. 3.

FIG. 7 is a side view of an illustrative blank which may be employed to produce the soldering tip of FIG. 3.

FIGS. 8, 9 and 10 are side, top and end views of an illustrative, modified embodiment of a soldering tip.

FIGS. 11 and 12 are side views of illustrative further modified embodiments of the soldering tip of FIGS. 8–10.

FIGS. 13, 14 and 15 are side, top and end views of an illustrative, special purpose desoldering tip.

FIG. 16 is a side view of an illustrative, modified further embodiment of the desoldering tip of FIGS. 13–15.

FIGS. 17, 18 and 19 are side, top and end views of a further modified desoldering tip embodiment.

DETAILED DESCRIPTION OF THE PREFERRED EMBODIMENTS OF THE INVENTION

Reference should be made to the drawing where like reference numerals refer to like parts.

In FIG. 1, the illustrative general purpose desolderer illustrated therein includes a handle 10 having disposed therein a solder collection chamber 12. The incorporation of such a chamber in an in-line desolderer is well known and is described, for example, in U.S. Pat. No. 3,392,897 granted to William J. Siegel, the latter patent being incorporated herein by reference. The solder collection chamber is adapted for connection to a vacuum source (not shown) via hose 14. A heater assembly 16 is carried by the handle and, as shown in FIG. 2, includes coil 18 which is connected to wire 19 of FIG. 1 in a known manner. The heater assembly has an opening 20 extending therethrough which communicates with solder collection chamber 12 via tube 22. Removably inserted in the heater assembly is a general purpose desoldering tip 24 which is secured to the assembly by set screw 26. The tip 24 has an opening 28 extending therethrough which communicates with the opening 20 in heater assembly 16. Hence, in normal operation, solder may be sucked through openings 28 and 20 into solder collection chamber 12 via tube 22.

In order to convert the general purpose desolderer to a soldering iron, a tip 30 may be mounted upon the desoldering tip 24. The tip 30 may be of various configurations as will be described hereinafter. An illustrative configuration is shown in FIGS. 4-6 which are side, top and end views respectively and in FIG. 3 which is a cross-sectional view, FIG. 3 being an enlarged view of the tip shown in FIGS. 1 and 2. The tip 30 is preferably friction fit onto desoldering tip 24. In order to facilitate the fit, tip 24 is preferably so configured that the distal end 32 thereof is cylindrical as is the proximal end 34 where the cross-sectional diameter of end 32 is less than that of end 34 and where the ends are joined by a tapered portion 36 where the taper is preferably low, the angle thereof with respect to the portion 32 generally being approximately 1°-15° and preferably 2°-7°. Other attachment means may also be employed such as screwing tip 30 onto tip 24 where internal threads would be provided on tip 30 and external threads would be provided on tip 24. Also tip 30 may be attached to tip 24 by set screw means similar to that of set screw 26.

The general configuration of soldering tip 30 is preferably cylindrical. The distal end 38 thereof may assume various configurations depending upon the particular soldering application. The proximal end 40 may be flared as shown in FIG. 3 although the flaring thereof is optional. If the proximal end is flared, friction contact between soldering tip 30 and desoldering tip 24 occurs not only at distal portion 32 of tip 24 but also at tapered portion 36. As stated above, a low taper should preferably be provided at tapered portion 36 to provide optimal wedging between soldering tip 30 and desoldering tip 24. If the flared portion 40 is not included, the friction contact occurs mainly at distal portion 32 although wedging also occurs at tapered portion 36. It has been found that tip 30 without flared portion 40 will suffice for most, if not all, practical applications.

As can be appreciated from FIG. 3, soldering tip 30 is hollow and may be produced from a tubular blank 42 such as shown in FIG. 7 whereby the distal end 38 thereof may be crimped with metal cutters or a pair of pliers to form the closed end configuration shown in FIGS. 4-6. In this regard, it should be appreciated that the repairman may be provided with a number of the blanks 42 whereby he may form on-the-spot the distal end 38 of the blank depending upon the particular soldering application confronting him at the time. Thus, as shown in FIGS. 8-10, the distal end may be formed as a flat portion 38. Further, as shown in FIG. 11, the flat portion may be angled as shown at 44 and 46. Alternatively, the flat portion may be bent as shown at 48 in FIG. 12. Further, the configuration of distal end 38 may be conical, pyramidal, chisel-like, screwdriver-like, etc. as is conventional in configuring soldering tips for various applications.

The soldering tip 30 is preferably made of a material having low mass, high thermal conductivity and low specific heat and in particular may be made of oxygen-free copper, the latter copper having less tendency to oxidize. Further, the copper may be nickel or steel plated in a conventional manner or may be tinned as is also conventionally done.

The material from which general purpose desoldering tip 24 is made should also have low mass, high thermal conductivity and low specific heat. Preferably, it may be copper coated with an electroless-nickel plating, the plating being preferred to prevent corrosion of the tip as molten solder is sucked through passageway 28, where plating of the desoldering tip in the above manner is known and conventional. Due to the plating of the general purpose desoldering tip, it is wetted only slightly by conventional solders. Hence, the desoldering tip by itself can not be readily employed in soldering applications.

Accordingly, the conversion of the general purpose desolderer to a soldering iron in accordance with this invention can be quickly and easily effected by the attachment of tip 30 where the construction of the tip is such that it is readily wetted by conventional solders to thereby readily permit soldering in various situations depending upon the selected configuration of the soldering tip. When operated as a soldering iron, vacuum is normally not applied to the desolderer. The electrical power source is energized whereby heat flows from heater assembly 16 through desoldering tip 24 and thence to soldering tip 30.

In order to convert the general purpose desolderer of FIGS. 1 and 2 to a special purpose desolderer, the illustrative special purpose desoldering tips shown in FIGS. 13-19 may be employed. As stated above, the configuration of distal end 32 of general purpose desoldering tip 24 is preferably cylindrical. Hence, this configuration is suitable for many applications. However, there are instances when this configuration would not be the optimal one. Thus, in some applications it is desirable to apply the desolderer to a terminal of generally rectangular configuration in such a manner that the terminal extends inside the desoldering tip. The cylindrical tip of FIG. 3 would not be suitable for this purpose. However, the tip 50 of FIGS. 13-15 would be very suitable in that the terminal can readily extend inside tip 50 through opening 52 to thereby effect rapid and complete solder removal.

Another embodiment of the special purpose desoldering tip of FIGS. 13-15 is shown in FIG. 16 where the end thereof is angled as shown in FIG. 16. Again, the various configurations formed at the distal end 38 of the blank 42 of FIG. 7 may be formed on-the-spot by the repairman with a pair of pliers or the like. One more example of a special purpose desoldering tip is shown in FIGS. 17-19 where a pair of openings 56 and 58 are formed at the distal end 38. Further, the tip may be notched (as all tips may be) as indicated at 52 whereby the tip tends to expand at the proximal end thereof as it engages tapered portion 36 thereby enhancing the friction fit.

After special purpose desoldering tip 50 has been attached to general purpose tip 24, the vacuum source and electrical power source are both energized whereby vacuum is applied through tip 50, the tip being heated from assembly 16 via tip 24.

There has been described apparatus including a general purpose desolderer which may be quickly and easily converted to either a soldering iron or a special purpose desolderer by a repairman where the converted desolderer takes up substantially the same space as the original general purpose desolderer and where the attachments for effecting the conversion also take up little space and may be quickly and easily attached.

I claim:

1. Apparatus including a general purpose desolderer and converting means for converting the general purpose desolderer to either a soldering iron or a special purpose desolderer, said apparatus comprising a handle;

solder collection means disposed within said handle and being adapted for connection to a vacuum source;

heating means connected to said handle, said means having an opening extending therethrough in communication with said solder collection means;

a desoldering tip in thermal contact with said heating means and having an opening extending therethrough in communication with the opening in said heating means so that when said device is employed as said desolderer, molten solder or the like may be sucked through said tip and said heater assembly into said solder collection chamber, said handle, solder collection means, heating means and desoldering tip comprising said general purpose desolderer; and said converting means including a further tip removably mounted on said desoldering tip and in heat contact therewith so that heat flows from the desoldering tip to the further tip whereby said general purpose desolderer may be converted to either said soldering iron or said special purpose desolderer depending on the configuration of said further tip.

2. Apparatus as in claim 1 where said further tip is hollow and is closed at the distal end thereof, said further tip being disposed on said desoldering tip to thereby convert the general purpose desolderer to a soldering iron.

3. Apparatus as in claim 1 where said further tip is hollow and is open at the distal end thereof, the foregoing open end having a configuration different than that of the open end of said desoldering tip, said further tip being disposed on said desoldering tip to thereby convert the general purpose desolderer to a special purpose desolderer.

4. Apparatus including a general purpose desolderer and converting means for converting said general purpose desolderer to a soldering iron, said apparatus comprising a handle;

solder collection means disposed within said handle and being adapted for connection to a vacuum source;

heating means connected to said handle, said means having an opening extending therethrough in communication with said solder collection means;

a desoldering tip in thermal contact with said heating means and having an opening extending therethrough in communication with the opening in said heating means so that when said device is employed as said desolderer, molten solder or the like may be sucked through said tip and said heater assembly into said solder collection chamber, said handle, solder collection means, heating means and desoldering tip comprising said general purpose desolderer; and said converting means including a soldering tip removably mounted on said desoldering tip and in heat contact therewith so that heat flows from the desoldering tip to the soldering tip whereby said general purpose desolderer is converted to said soldering iron.

5. Apparatus as in claim 4 where said soldering tip is hollow and is disposed on said desoldering tip in friction contact therewith.

6. Apparatus as in claim 5 where said desoldering tip includes a cylindrical portion at the distal end thereof, said soldering tip being disposed on at least said cylindrical portion.

7. Apparatus as in claim 6 where said desoldering tip includes an outwardly tapered portion adjacent said cylindrical portion and where said soldering tip includes an outwardly flared portion which is in friction engagement with said outwardly tapered portion of the desoldering tip.

8. Apparatus as in claim 4 where said desoldering tip is made of copper and coated with a corrosion resistant material.

9. A device as in claim 8 where said corrosion resistant material is nickel.

10. Apparatus as in claim 8 where said soldering tip is made of copper.

11. Apparatus as in claim 4 where said soldering tip has a predetermined configuration at the distal end thereof and is cylindrical at the proximal end thereof.

12. Apparatus as in claim 11 where said predetermined configuration is flat.

13. Apparatus as in claim 11 where said predetermined configuration is chisel-like.

14. Apparatus as in claim 11 where said predetermined configuration is screwdriver-like.

15. Apparatus as in claim 11 where said soldering tip is angled at the distal end thereof.

16. Apparatus including a general purpose desolderer and converting means for converting said general purpose desolderer to a special purpose desolderer, said apparatus comprising a handle;

solder collection means disposed within said handle and being adapted for connection to a vacuum source;

heating means connected to said handle, said means having an opening extending therethrough in communication with said solder collection means;

a first tip in thermal contact with said heating means and having an opening extending therethrough in communication with the opening in said heating means so that molten solder or the like may be sucked through said tip and said heater assembly into said solder collection chamber, said handle, solder collection means, heating means and first tip comprising said general purpose desolderer; and said converting means including a second tip removably mounted on said first tip and in heat contact therewith, said second tip having an opening extending therethrough in communication with the opening in said first tip and the configuration of the distal end of said second tip being different from that of the distal end of said first tip, so that heat flows from the first tip to the second tip whereby said general purpose desolderer is converted to said special purpose desolderer.

17. Apparatus as in claim 16 where said second tip has a predetermined configuration at the distal end thereof and is cylindrical at the proximal end thereof.

18. Apparatus as in claim 16 where said configuration of the distal end of said second tip is oblong.

19. Apparatus as in claim 16 where the distal end of said second tip is angled.

20. Apparatus as in claim 16 where said second tip is hollow and is disposed on said first tip in friction contact therewith.

21. Apparatus as in claim 20 where said first tip includes a cylindrical portion at the distal end thereof, said second tip being disposed on at least said cylindrical portion.

22. Apparatus as in claim 20 where said first tip includes an outwardly tapered portion connected to said cylindrical portion and where said second tip is notched at the proximal end thereof to facilitate friction engagement thereof with said outwardly tapered portion of the first tip.

23. Apparatus as in claim 22 where said second tip is made of copper.

24. Apparatus as in claim 16 where said first tip is made of copper and coated with a corrosion resistant material.

25. Apparatus as in claim 24 where said corrosion resistant material is nickel.

26. A hollow soldering tip comprising a low mass, high thermal conductivity and low specific heat material having a longitudinal axis extending from a distal to a proximal end thereof, said tip including a wall of constant thickness extending from said distal end to said proximal end thereof, said tip also including a flat portion at the distal end thereof and a tubular proximal end adapted for mounting on the tip of a desoldering device, a cross-section of said flat portion transverse to said longitudinal axis being such that one half of said wall of the tip is parallel to and in contact with the other half thereof.

27. A soldering tip as in claim 26 where said material is copper.

28. A soldering tip as in claim 26 where said tip has a smooth interior surface at said proximal end.

29. A hollow desoldering tip comprising a low mass, high thermal conductivity and low specific heat material having a longitudinal axis extending from a distal to a proximal end thereof, said tip including a wall of constant thickness extending from said distal end to said proximal end thereof, said tip also having an opening extending therethrough along said longitudinal axis, said tip further having a a flat portion at the distal end thereof and a tubular configuration at the proximal end thereof adapted for mounting on the tip of a desoldering device, a cross-section of said flat portion transverse to said longitudinal axis being such that at least a substantial portion of one half of said wall of the tip is spaced from and parallel to the other half thereof.

30. A desoldering tip as in claim 29 where said material is copper.

31. A desoldering tip as in claim 29 where said cross-section is oblong.

* * * * *